United States Patent [19]

Bishop

[11] 4,210,500
[45] Jul. 1, 1980

[54] ALKALINE ZINC ELECTROPLATING BATH AND ADDITIVE COMPOSITIONS THEREFOR

[75] Inventor: Craig V. Bishop, Cleveland, Ohio

[73] Assignee: Rohco, Inc., Cleveland, Ohio

[21] Appl. No.: 52,741

[22] Filed: Jun. 28, 1979

[51] Int. Cl.$^2$ ............... C25D 3/24; C08G 73/02; C08G 73/04
[52] U.S. Cl. .................................. 204/55 Y; 528/391
[58] Field of Search ....................... 528/391; 204/55 Y

[56] References Cited

U.S. PATENT DOCUMENTS 4,146,442  3/1979  McFarland ........................ 204/55 Y Primary Examiner—G. L. Kaplan
Attorney, Agent, or Firm—Maky, Renner, Otto & Boisselle

[57] ABSTRACT

A composition is described which provides an improvement in the electrodeposition of zinc from aqueous alkaline plating baths containing cyanide ions. The new composition comprises the reaction product obtained by the process of reacting
(a) a polyhydroxyethylated polyamine having a carbon to nitrogen weight ratio of about 2.8:1 to about 3.3:1 and a nitrogen to oxygen weight ratio of about 1:1 to about 2:1, and
(b) a 3-halo-2-hydroxypropane sulfonate.

Aqueous, alkaline cyanide zinc electroplating baths containing the additive compositions of the invention deposit a bright zinc coating over a wide range of current densities.

11 Claims, No Drawings ing baths. More particularly, the improvement relates to a new composition which is particularly suitable as a brightener additive for aqueous alkaline cyanide zinc electrodepositing baths.

ALKALINE ZINC ELECTROPLATING BATH AND ADDITIVE COMPOSITIONS THEREFOR

BACKGROUND OF THE INVENTION

This invention relates to improvements in the electrodeposition of zinc from aqueous alkaline cyanide zinc plating baths. More particularly, the improvement relates to a new composition which is particularly suitable as a brightener additive for aqueous alkaline cyanide zinc electrodepositing baths.

Considerable attention has been directed to the development of zinc electroplating baths which will produce zinc deposits of improved quality. Research has been devoted to improving the over-all brightness, the range of allowable current densities, and the ductility of the zinc coatings. Many of the successful aqueous alkaline zinc plating baths contain various quantities of sodium cyanide and various brightener compositions to improve the brightness of the zinc deposits.

Although considerable research has been conducted to develop alkaline plating baths which do not contain cyanides, there continues to be a demand for alkaline systems which do contain cyanide ions and which produce desirable zinc deposits. In general, the alkaline cyanide baths are less expensive to operate. One reason for the reduced expense is that the alkaline cyanide baths consume lesser amounts of additives such as brighteners when compared to non-cyanide plating baths. Moreover, alkaline cyanide zinc plating baths generally are more effective in plating substrates having recesses (such as cup shapes).

Blends of polyvinyl alcohol with other active brightening ingredients have been disclosed as being useful in alkaline cyanide zinc plating baths in, for example, U.S. Pat. Nos. 3,318,787 and 3,411,996. Aqueous alkaline zinc electroplating baths containing vinyl alcohol polymers and copolymers degraded with periodic acid or an alkali metal periodate have been described in U.S. Pat. No. 3,769,183. These baths are reported to give improved plating characteristics at low applied currents.

The use of bath soluble polyethyleneimines as addition agents in alkaline zinc cyanide electroplating baths has been described in U.S. Pat. No. 3,393,135. In U.S. Pat. No. 4,146,442, the use of polymeric nitrogen-containing compounds prepared by reacting poly(alkyleneimines) with a cyclic carbonate have been described.

SUMMARY OF THE INVENTION

The present invention comprises a novel composition which is the reaction product obtained by the process of reacting
(a) a polyhydroxyethylated polyamine having a carbon to nitrogen weight ratio of about 2.8:1 to about 3.3:1 and a nitrogen to oxygen weight ratio of about 1:1 to about 2:1, and
(b) a 3-halo-2-hydroxypropane sulfonate.
These compositions are effective particularly as brightening agents for aqueous alkaline cyanide zinc electroplating baths. The baths containing these novel compositions deposit bright zinc coatings over a wide range of current densities.

DESCRIPTION OF THE PREFERRED EMBODIMENTS

The compositions of this invention which are particularly useful as additive compositions for aqueous alkaline cyanide zinc electroplating baths are prepared by reacting a polyhydroxyethylated polyamine with a propane sulfonate. The polyhydroxyethylated polyamines which are useful in the preparation of the compositions of the invention generally will contain a carbon to nitrogen weight ratio of about 2.8:1 to about 3.3:1 or higher, and a nitrogen to oxygen ratio of from about 1:1 to about 2:1 or higher.

The polyhydroxyethylated polyamines can be prepared by reacting a polyethyleneimine with ethylene oxide in amounts which are sufficient to provide the product having the desired carbon to nitrogen and nitrogen to oxygen ratios. Reaction can be effected by heating the mixture of polyethyleneimine and ethylene oxide, with or without diluent or solvent such as water, under suitable time and temperature conditions which can be determined readily by those skilled in the art. The exact nature of the product is unknown but the product does appear to contain secondary and tertiary amine groups as determined by carbon-13 nuclear magnetic resonance spectrometry and has a substantial hydroxyl content.

One example of a polyhydroxyethylated polyamine is available from Cordova Chemical, Sacramento, Calif. under the general trade designation COR-6. This material is available as a 35–40% aqueous solution with a pH of about 11.5, a carbon to nitrogen weight ratio of from about 2.8:1 to about 3.3:1, and a nitrogen to oxygen weight ratio of from about 1:1 to about 1.6:1.

The halo-hydroxypropane sulfonates which are useful in the preparation of the additive compositions of the invention are the 3-halo-2-hydroxypropane sulfonates such as sodium-3-chloro-2-hydroxypropane sulfonate. The sodium-3-chloro-2-hydroxypropane sulfonate is available from Hilton-Davis Chemical Company, a Division of Sterling Drug, Inc., Cincinnati, Ohio.

The additive compositions of the invention are obtained by reacting the polyhydroxyethylated polyamines with the propane sulfonate in a weight ratio of from about 3:1 to about 1:3. Generally, this reaction is conducted in an aqueous base at a pH greater than 9 and heated to give a constant refluxing action until the ethylene oxide has reacted with the polyethyleneimine. A period of from about three to six hours appears to be sufficient at the reflux temperature. The amount of solvent or diluent such as water can be varied as desired to facilitate the reaction.

The following examples illustrate the procedure for preparing the additive compositions of the invention which are useful in plating baths. Unless otherwise indicated, all parts and percentages are by weight.

COMPOSITION 1

A mixture of 125 grams of a commercially available polyethyleneimine-ethylene oxide reaction product available under the trade designation COR-6 and 28.6 grams of sodium-3-chloro-2-hydroxypropane sulfonate is prepared, heated to reflux at 104° C. and maintained at the reflux temperature for about two hours. The resulting amber solution is cooled to room temperature.

COMPOSITION 2

The procedure of example 1 is repeated except that the mixture contains 56.5 grams of the propane sulfonate.

COMPOSITION 3

The procedure of example 1 is repeated except that the mixture contains 113 grams of the propane sulfonate.

The compositions of the invention which are exemplified above are useful as brightening additive compounds for aqueous alkaline cyanide zinc electroplating baths. The amount of the composition added to the alkaline cyanide zinc electroplating baths is an amount which is effective in producing a bright and generally level deposit of zinc. Depending upon the particular plating bath and the nature of the other compounds contained in the bath, the brightening effective amount of the composition of the invention may range from about 0.1 to about as much as 15 to 20 g/l of bath.

The efficacy of the alkaline zinc electroplating baths of the invention may be improved by including various other materials in the plating baths, and the nature of such materials generally will depend upon the nature of the bath. Alkaline zinc electroplating baths are prepared from a zinc source and an alkaline material. Sources of zinc ions for aqueous alkaline baths can be an alkali metal zincate such as sodium zincate or potassium zincate. Other sources of zinc ions include zinc oxide, zinc sulfate, zinc acetate, etc. The alkaline material used to form the alkaline baths usually is an alkali metal hydroxide such as sodium hydroxide or potassium hydroxide. The source of the cyanide can be zinc cyanide or sodium cyanide. The alkaline cyanide zinc plating baths generally will contain from about 4 to about 50 g/l of zinc ions, from about 4 to about 100 g/l of cyanide ions and from about 60 to 100 grams or more of a base such as sodium hydroxide. The pH of the alkaline zinc baths generally will be in the range of from about 10 to around 14. The bath pH can be adjusted by the addition of a base such as sodium hydroxide.

The bright deposits obtained by the aqueous alkaline cyanide zinc plating baths containing the compositions of the invention may be improved if the bath also contains at least one aromatic carbonyl-containing compound which acts as a supplementary brightener imparting optimum levelling action over a wider plating range. The following compounds illustrate the types of aromatic carbonyl-containing compounds which are useful as brighteners in the plating baths of the invention, and these carbonyl compounds include aldehydes as well as ketones: ortho-chlorobenzaldehyde, para-chlorobenzaldehyde, ortho-hydroxybenzaldehyde, aminobenzaldehyde, veratraldehyde, benzylidine acetone, coumarin, 3,4,5,6-tetrahydrobenzaldehyde, acetophenone, propiophenone, benzaldehyde, vanillin, hydroxybenzaldehyde, anisic aldehyde, benzoic acid, sodium benzoate, sodium salicylate, and 3-pyridine carboxylic acid (nicotinic acid). Mixtures of one or more of the aldehydes with one or more ketones also are useful. The aldehyde brighteners generally are added to the electroplating bath as a bisulfite addition product. When employed in the baths of the invention, the carbonyl-containing brighteners may be included in an amount of from about 0.02 to about 5 g/l or higher. The properties of the zinc deposit from the aqueous alkaline baths of the invention further may be enhanced by including in the baths, other additives conventionally used in such baths. Examples of useful additives include polyvinyl alcohols, manganous sulfate, nickel sulfate and other amine polymers such as those obtained by reacting ammonia with an aldehyde such as formaldehyde.

The following examples illustrate the types of additive compositions which can be incorporated into alkaline cyanide zinc plating baths in accordance with the invention.

|  | g/l |
|---|---|
| Additive Composition I |  |
| Composition I | 30 |
| Sodium N-benzyl nicotinate | 90 |
| Polyvinyl alcohol | 5 |
| Anisic aldehyde | 6 |
| Sodium bisulfite | 6 |
| Water to volume |  |
| Additive Composition II |  |
| Composition 2 | 60 |
| Sodium N-benzyl nicotinate | 75 |
| Veratraldehyde | 10 |
| Sodium bisulfite | 10 |
| Water to volume |  |
| Addition Composition III |  |
| Composition 3 | 30 |
| Sodium N-benzyl nicotinate | 100 |
| Polyvinyl alcohol | 5 |
| Water to volume |  |

The above illustrative additive compositions as well as the compositions of the invention illustrated in examples 1–3 may be added to alkaline zinc plating baths in various amounts such as from about 0.1 to about 1% based on the bath volume or about 1 to about 10 ml per liter of bath. Generally, about 3 mls. of the additive composition will be utilized in the alkaline zinc plating baths.

The following examples illustrate the aqueous alkaline cyanide zinc electroplating baths of the invention.

| Plating Bath A - (high cyanide) | |
|---|---|
| Zinc (calculated as zinc oxide) | 30 g/l |
| Sodium cyanide | 90 g/l |
| Sodium hydroxide | 75 g/l |
| Additive composition I | 5 ml/l |
| Plating Bath B - (mid cyanide) | |
| Zinc (calculated as zinc oxide) | 18 g/l |
| Sodium cyanide | 45 g/l |
| Sodium hydroxide | 75 g/l |
| Additive composition II | 5 ml/l |
| Plating Bath C - (low cyanide) | |
| Zinc (calculated as zinc oxide) | 7.5 g/l |
| Sodium hydroxide | 75 g/l |
| Sodium cyanide | 7.5 g/l |
| Additive composition I | 3 ml/l |
| Plating Bath D - (high cyanide) | |
| Zinc (calculated as zinc oxide) | 35 g/l |
| Sodium cyanide | 90 g/l |
| Sodium hydroxide | 75 g/l |
| Additive composition II | 5 ml/l |
| Plating Bath E - (mid cyanide) | |
| Zinc (calculated as zinc oxide) | 18 g/l |
| Sodium cyanide | 45 g/l |
| Sodium hydroxide | 75 g/l |
| Additive composition I | 3 ml/l |
| Plating Bath F - (high cyanide) | |
| Zinc (calculated as zinc oxide) | 35 g/l |
| Sodium cyanide | 90 g/l |
| Sodium hydroxide | 75 g/l |
| Additive composition III | 3 ml/l |
| Plating Bath G - (low cyanide) | |
| Zinc (calculated as zinc oxide) | 7.5 g/l |
| Sodium hydroxide | 75 g/l |
| Sodium cyanide | 7.5 g/l |
| Additive composition II | 3 ml/l |

The plating baths of the invention such as those illustrated above will deposit a bright, level and ductile zinc deposit on substrates at conventional temperatures such as about 20° to about 60° C. The efficacy of the plating baths of the invention is determined by conducting plating tests in 267 ml. Hull Cell at an operating current of 3 amps for 5 minutes at room temperature. The zinc is deposited on a steel Hull Cell panel. A bright zinc deposit is obtained across the panel from below 5 amps/sq.ft. to over 120 amps/sq.ft. as measured with a Hull Cell scale.

The plating baths of the invention may be operated on a continuous or intermittent basis, and from time to time, the components of the bath may have to be replenished. The various components may be added singularly as required or may be added in combination. The amounts of the various compositions to be added to the plating baths may be varied over a wide range depending on the nature and performance of the zinc plating bath to which the composition is added. Such amounts can be determined readily by those skilled in the art.

The alkaline cyanide zinc electroplating baths containing the compositions of the invention may be utilized to produce bright zinc deposits on all types of metals and alloys, for example, on iron, zinc die cast, copper and brass. The electroplating baths may be employed in all types of industrial zinc plating processes including still plating baths, high-speed plating baths or strip or wire plating, and in barrel plating.

I claim:

1. A composition comprising the reaction product obtained by reacting
   (a) a polyhydroxyethylated polyamine having a carbon to nitrogen weight ratio of from about 2.8:1 to about 3.3:1 and a nitrogen to oxygen weight ratio of from about 1:1 to about 2.0:1, and
   (b) a 3-halo-2-hydroxypropane sulfonate.

2. The composition of claim 1 obtained by reacting the polyhydroxyethylated polyamine with the propane sulfonate in a weight ratio of from about 3:1 to about 1:3.

3. The composition of claim 1 wherein the polyhydroxyethylated polyamine is obtained by reacting polyethyleneimine with ethylene oxide.

4. The composition of claim 1 wherein the sulfonate is sodium 3-chloro-2-hydroxypropane sulfonate.

5. A composition comprising the reaction product of
   (a) a polyhydroxyethylated polyamine having a carbon to nitrogen weight ratio of about 2.8:1 to about 3.3:1 and a nitrogen to oxygen weight ratio of about 1:1 to about 1.6:1, and
   (b) 0.3 to 3.0 weight parts, per weight parts of polyamine of sodium 3-chloro-2-hydroxypropane sulfonate.

6. An aqueous alkaline electroplating bath suitable for producing bright metallic zinc deposits comprising a source of zinc ions and cyanide ions, and an effective amount, sufficient to yield a bright zinc deposit, of a bath-soluble reaction product obtained by the process of reacting
   (a) a polyhydroxyethylated polyamine having a carbon to nitrogen weight ratio of about 2.8:1 to about 3.3:1 and a nitrogen to oxygen weight ratio of about 1:1 to about 2:1, and
   (b) a 3-halo-2-hydroxypropane sulfonate.

7. The bath of claim 6 wherein the polyhydroxyethylated polyamine is reacted with the propane sulfonate in a weight ratio of from about 3:1 to about 1:3.

8. The bath of claim 6 wherein the polyhydroxyethylated polyamine is obtained by reacting polyethyleneimine with ethylene oxide.

9. The bath of claim 6 wherein the propane sulfonate is sodium 3-chloro-2-hydroxypropane sulfonate.

10. The bath of claim 6 wherein the bath also contains an aromatic carbonyl-containing compound.

11. A method of electrodepositing a zinc coating on a substrate which comprises electroplating said substrate with a zinc plating bath according to any one of claims 6–10.

* * * * *